United States Patent
Mironets et al.

(10) Patent No.: US 8,915,728 B2
(45) Date of Patent: Dec. 23, 2014

(54) MULTI-DIMENSIONAL COMPONENT BUILD SYSTEM AND PROCESS

(75) Inventors: Sergey Mironets, Norfolk, CT (US); Agnes Klucha, Colchester, CT (US); Wendell V. Twelves, Jr., Glastonbury, CT (US); Benjamin T. Fisk, East Granby, CT (US)

(73) Assignee: United Technologies Corporation, Hartford, CT (US)

( * ) Notice: Subject to any disclaimer, the term of this patent is extended or adjusted under 35 U.S.C. 154(b) by 193 days.

(21) Appl. No.: 13/359,749

(22) Filed: Jan. 27, 2012

(65) Prior Publication Data

US 2013/0193620 A1      Aug. 1, 2013

(51) Int. Cl.
  *B29C 41/00*      (2006.01)

(52) U.S. Cl.
  USPC ............. 425/73; 264/497; 264/401; 264/308; 264/85; 425/174.4; 425/815

(58) Field of Classification Search
  USPC .......................................................... 425/73
  See application file for complete search history.

(56) References Cited

U.S. PATENT DOCUMENTS

| | | | |
|---|---|---|---|
| 4,492,843 A * | 1/1985 | Miller et al. | ............. 219/121.63 |
| 4,510,363 A * | 4/1985 | Reynolds, Jr. | ................ 219/656 |
| 5,518,385 A | 5/1996 | Graff | |
| 7,357,629 B2 | 4/2008 | Weiskopf et al. | |
| 7,520,740 B2 | 4/2009 | Wahlstrom et al. | |
| 7,665,979 B2 | 2/2010 | Heugel | |
| 2004/0021256 A1 * | 2/2004 | DeGrange et al. | ............. 264/497 |
| 2005/0116391 A1 | 6/2005 | Lindemann et al. | |
| 2006/0108712 A1 | 5/2006 | Mattes | |
| 2006/0118532 A1 * | 6/2006 | Chung et al. | ............. 219/121.85 |
| 2007/0059158 A1 | 3/2007 | Alvanos et al. | |
| 2007/0077323 A1 | 4/2007 | Stonesmith et al. | |

FOREIGN PATENT DOCUMENTS

| WO | 2010/007394 A1 | 1/2010 |
|---|---|---|
| WO | 2011110521 | 9/2011 |

OTHER PUBLICATIONS

International Search Report for PCT Application No. PCT/US2013/021862 completed on Mar. 11, 2013.
International Preliminary Report on Patentability for PCT Application No. PCT/US2013/021862 mailed on Aug. 7, 2014.

* cited by examiner

*Primary Examiner* — Matthew Daniels
(74) *Attorney, Agent, or Firm* — Carlson, Gaskey & Olds, P.C.

(57) ABSTRACT

An example multi-dimensional component building system includes a first chamber having at least one base, a second chamber adjacent to and in fluid communication with the first chamber through a first door, and a third chamber adjacent to and in fluid communication with the second chamber through a second door. The second chamber is fluidly sealed from the first chamber if the first door is in a closed position. The second chamber includes a directed heat source, a build-up material and is configured to receive the at least one base if the fluid parameters of the first chamber and second chamber are approximately equal. The third chamber is fluidly sealed from the second chamber if the first door is in a closed position. The third chamber is configured to receive the at least one base, having a formed component disposed thereon, if the second door is in an open position.

16 Claims, 3 Drawing Sheets

MULTI-DIMENSIONAL COMPONENT BUILD SYSTEM AND PROCESS

BACKGROUND

This disclosure is related to build systems for manufacturing and repairing components, and more specifically to a build systems for forming gas turbine engine components from build-up material using a heat source.

Systems using build-up materials, such as powders, with a heat source are used to create multi-dimensional components for various tasks. Typically, build-up material is disposed on a build surface, within a chamber, to be affected by the heat source and form the component. After the component is formed, the component is removed so that the forming of another component can begin. In order to proceed with the next forming process, the atmosphere within the chamber must be purged of contaminants that enter during removal of the component after forming. Excess build-up material is also removed from the component after forming.

SUMMARY

An example multi-dimensional component building system includes a first chamber having at least one base disposed therein, a second chamber adjacent to and in fluid communication with the first chamber through a first door, and a third chamber adjacent to and in fluid communication with the second chamber through a second door. The second chamber is fluidly sealed from the first chamber if the first door is in a closed position. The second chamber is configured to receive the at least one base via a first transfer mechanism if the fluid parameters of the first chamber are approximately equal to the fluid parameters of the second chamber. The second chamber includes a directed heat source and a build-up material configured to form a component on the at least one base by melting or sintering. The third chamber is fluidly sealed from the second chamber if the first door is in a closed position. The third chamber is configured to receive the at least one base, having a formed component disposed thereon, via a second transfer mechanism if the second door is in an open position. The fluid parameters of the second chamber are not substantially affected by fluid communication with the first chamber or the third chamber.

In a further non-limiting embodiment of the foregoing multi-dimensional component system, a controller is in communication with the first chamber, the second chamber, and the third chamber such that the controller controls the fluid parameters of the first chamber, the second chamber, and the third chamber.

In a further non-limiting embodiment of the foregoing multi-dimensional component system, the controller is in communication with a sensor in each of the first chamber, the second chamber, and the third chamber. Each sensor monitors the fluid parameters of the respective first chamber, second chamber, and third chamber.

In a further non-limiting embodiment of the foregoing multi-dimensional component system, the controller is in communication with at least one pump. The pump is fluidly connected to the first chamber, the second chamber, and the third chamber and configured to adjust fluid parameters of at least one of the first chamber, the second chamber, and the third chamber in response to a command from the controller.

In a further non-limiting embodiment of the foregoing multi-dimensional component system, the fluid parameter is oxygen content.

In a further non-limiting embodiment of the foregoing multi-dimensional component system, the oxygen content in the second chamber is maintained equal to or below 10 parts per million.

In a further non-limiting embodiment of the foregoing multi-dimensional component system, the third chamber includes tooling to remove excess build-up material.

In a further non-limiting embodiment of the foregoing multi-dimensional component system, the tooling is one of a vacuum or a brush.

In a further non-limiting embodiment of the foregoing multi-dimensional component system, the fluid in the second chamber is maintained at a higher pressure then the fluid in the first chamber and the third chamber.

Another example multi-dimensional component building system includes a first chamber adjacent to and in fluid communication with at least one second chamber through at least one door. The first chamber is fluidly sealed from the at least one second chamber if the at least one door is in a closed position. The at least one second chamber is configured to provide a base to a first platform in the first chamber if at least one door is open and fluid parameters of the first chamber and the at least one second chamber are substantially equal. The first chamber includes the first platform moveable by a first piston adjacent a second platform moveable by a second piston. The first platform is configured to receive at least one base. A dispenser in communication with build-up material disposed on the second platform is configured to move a portion of the build-up material from the second platform onto the at least one base on the first platform. The first chamber includes a beam source to form a component on the at least one base from the build-up material by melting or sintering.

In a further non-limiting embodiment of the foregoing multi-dimensional component system, the first platform and the second platform are separated by a wall and the at least one base, wall, and side walls of the first chamber form a cavity receiving the build-up material from the second platform.

In a further non-limiting embodiment of the foregoing multi-dimensional component system, the beam source is one of a laser or electron beam.

An example method of building a multi-dimensional component includes providing a first chamber, a second chamber, and a third chamber. The first chamber and second chamber are connected by a first door and the second chamber and the third chamber are connected by a second door. The first door fluidly seals the first chamber from the second chamber and the second door fluidly seals the second chamber from the third chamber. A first base is disposed in the first chamber. Fluid parameters are determined in the second chamber if the first door and second door are in a closed position. Fluid parameters are maintained approximately equal in the first chamber, the second chamber, and the third chamber prior to either the first door and the second door moving from a closed position to an open position. The first base moves from the first chamber to a second chamber through the first door in an open position. The first door and the second door close such that the second chamber is fluidly sealed from the first chamber and the third chamber. A build-up material is melted with a direct heat source to form a component on the first base in the second chamber. Fluid parameters are maintained approximately equal in the second chamber and the third chamber prior to moving the second door from the closed position to the open position after forming the component. The second door is opened and the formed component and the first base are moved from the second chamber to a third chamber through the second door.

In a further non-limiting embodiment of the foregoing method of building a multi-dimensional component, a second base is provided in the first chamber, fluid parameters are maintained approximately equal in the first chamber and the second chamber, the first door and the second door are opened, and the second base is moved into the second chamber while simultaneously moving the first base into the third chamber.

In a further non-limiting embodiment of the foregoing method of building a multi-dimensional component, the formed component is heat treated in the third chamber such that excess build-up material is removed.

In a further non-limiting embodiment of the foregoing method of building a multi-dimensional component, the build-up material is moved from a second platform to a cavity formed by a wall between the second platform and a first platform, the base, and side walls of the second chamber and a portion of the build-up material is melted with the direct heat source to form a layer of the component on the first base in the second chamber.

In a further non-limiting embodiment of the foregoing method of building a multi-dimensional component, moving the build-up material is performed by a dispenser arranged to move across the first platform and second platform.

In a further non-limiting embodiment of the foregoing method of building a multi-dimensional component, the first platform and base is lowered after melting the portion of the build-up material and the second platform is raised after melting a portion of the build-up material.

In a further non-limiting embodiment of the foregoing method of building a multi-dimensional component, the fluid parameter is oxygen content within the second chamber.

In a further non-limiting embodiment of the foregoing method of building a multi-dimensional component, only one of the first door and second door is in an open position and only one of the first door and second door is in a closed position, the first chamber and the third chamber having different fluid parameters.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
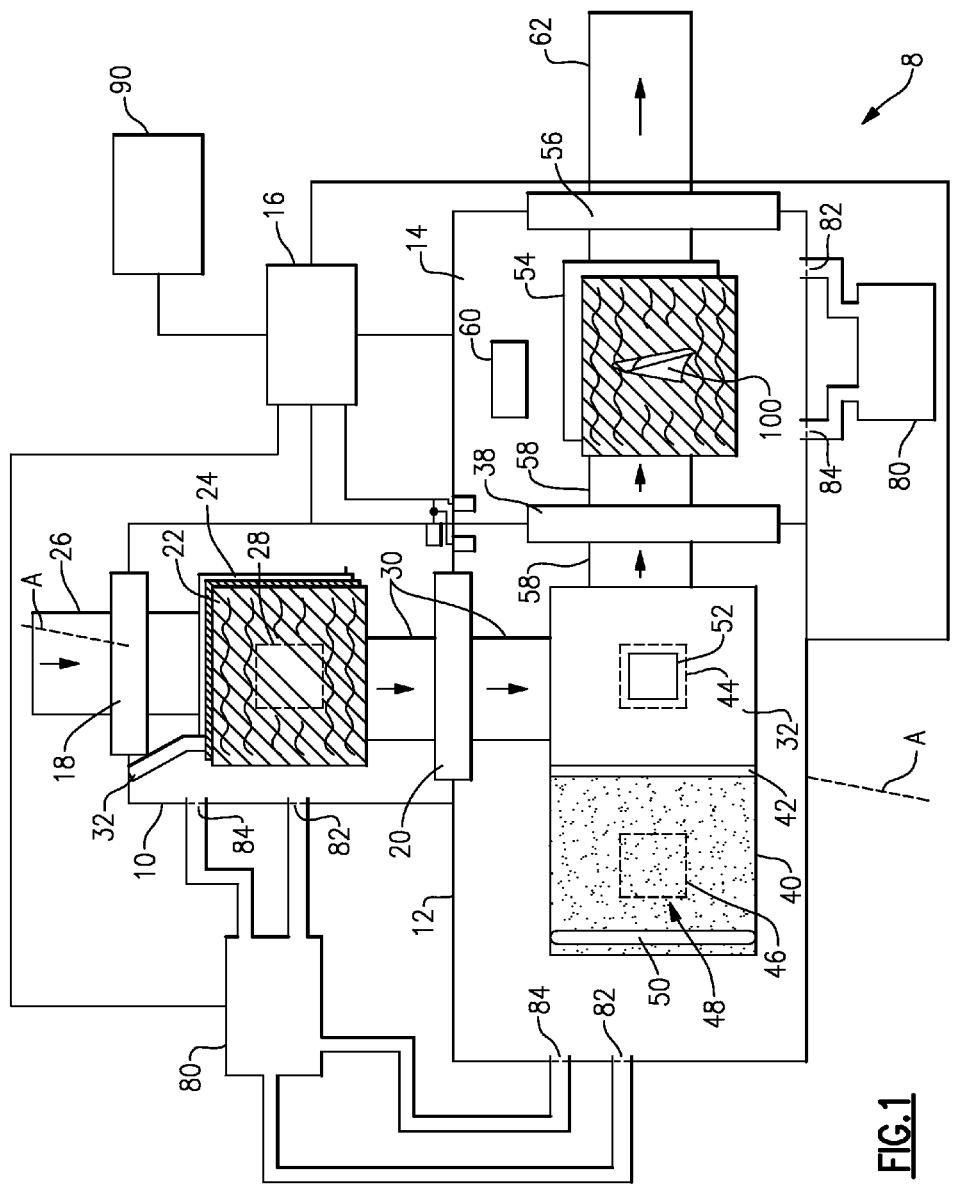
FIG. 1 is a top view of an example multi-dimensional component building system including schematically shown features.

Referring to FIG. 1, an example multi-dimensional component building system ("building system") 8 includes a first chamber 10, a second chamber 12, a third chamber 14, and a controller 16. At least one base 22 is provided to act as a surface on which a component 100 is formed. In one example, the base 22 may form part of the component 100.

The first chamber 10 acts to load bases 22, the second chamber 12 acts to form components 100 on the bases 22, and the third chamber 14 acts to receive the formed components 100 on the bases 22 from the second chamber 12 so the components 100 can undergo post processing, if desired. During transfer of the bases 22 between the first chamber 10 and the second chamber 12, and between the second chamber 12 and the third chamber 14, fluid parameters such as air pressure, temperature, humidity, and atmospheric material content, are approximately equalized between chambers 10, 12, 14 which are in fluid communication during transfer of the bases 22 and components 100. The fluid parameters provide an atmosphere in the second chamber 12 allowing formation of components 100, such as gas turbine engine components 100, to pre-determined specifications and characteristics by sintering, melting, or welding.

The first chamber 10 is arranged adjacent to the second chamber 12 and includes a first door 18 and a second door 20. First door 18 moves vertically along axis A between an open position, where the first chamber 10 is in fluid communication with an outside environment, and a closed position, where first door 18 fluidly seals the first chamber 10 from the outside environment. If first door 18 is in the open position, one or more bases 22, such as plates 22 or other parts, can be loaded onto platform 24 of first chamber 10. In one example, the bases 22 are loaded by first transfer mechanism 26 (shown schematically). However, the bases 22 may be loaded manually by an operator through first door 18 onto platform 24. After loading, first door 18 is closed to fluidly seal first chamber 10.

First chamber 10 is connected to the second chamber 12 via a shared second door 20. Second door 20 moves vertically along axis A between an open position, where the first chamber 10 is in fluid communication with second chamber 12, and a closed position, where second door 20 fluidly seals the first chamber 10 from the second chamber 12. If second door 20 is in an open position, one of the bases 22 disposed on platform 24 is moved by second transfer mechanism 30 (shown schematically) through the second door 20 and onto a first platform 32 of the second chamber 12. When the second door 20 is in an open position, the first door 18 remains closed, sealing the first chamber 10 and second chamber 12 from the outside environment. Once the base 22 has been moved to the first platform 32 of second chamber 12, the second door 20 is closed fluidly sealing the second chamber 12 from the first chamber 10. Second door 20 seals by contacting first chamber 10, second chamber 12, and first transfer mechanism 26 if in the closed position. However, second door 20 may be arranged to fluidly seal the first chamber 10 from the second chamber 12 in other ways.

In one example, a tool 34 is disposed in the first chamber 10 to move the bases 22 onto second transfer mechanism 30. Tool 34 may be a conveyor, pusher, claw, or other tooling arranged to move the bases 22. However, other methods of moving bases 22 to second transfer mechanism 30 may be used.

In one example, the platform 24 of first chamber 10 is attached to a piston 28 (shown in phantom) such that piston 28 moves platform 24, and the bases 22 on platform 24, vertically along axis A (extending approximately normal to the viewing plane). Vertical movement of platform 24 allows for a plurality of bases 22 to be loaded in a single process such that first door 18 is only opened a single time during a build cycle. In this example, due to the first chamber 10 being sealed except when in fluid communication with the second chamber 12, the fluid parameters of the first chamber 10 can be approximately equalized to the fluid parameters of the second chamber 12 a single time and then maintained while all the bases 22 are used. Once first door 18 is opened again, or first chamber 10 is subjected to the outside environment, the fluid parameters of the first chamber 10 will change and need to be equalized again during the formation process. Platform 24 receives the plurality of bases 22 and can move vertically to provide one of the plurality of bases 22 to second transfer mechanism 30 if second door 20 is opened.

The second chamber 12 is adjacent to first chamber 10 and third chamber 14. Second chamber 12 is connected to first chamber 10 via second door 20 and to third chamber 14 via third door 38. Third door 38 moves vertically along axis A between an open position, where the second chamber 12 is in fluid communication with third chamber 14, and a closed position, where second door 20 fluidly seals the third chamber 10 from the second chamber 12. If both second door 20 and third door 38 are in a closed position, the second chamber 12 is fluidly sealed. Third door 38 fluidly seals by contacting second chamber 12, third chamber 14, and third transfer mechanism 58 if in the closed position.

The first platform 32 is arranged generally adjacent second platform 40 in the second chamber 12. A wall 42 is disposed between the first platform 32 and the second platform 40. First platform 32 is attached to first piston 44 (shown in phantom; see also FIGS. 2 and 3) and second platform 40 is attached to second piston 46 (shown in phantom; see also FIGS. 2 and 3) such that first platform 32 is moveable parallel to second platform 40 along axis A.

During the component forming process, build-up material 48 is pre-disposed on second platform 40. If the base 22 is disposed on first platform 32, the build-up material 48 is pushed from the first platform onto the base 22 by a dispenser 50. Once the build-up material 48 is on the base 22, a directed heat source, such as a beam source 52 moveable about axis A, is arranged above the base 22 and provides directed heat to melt a portion of the build-up material 48 in a pre-determined pattern. After the melted build-up material hardens, a layer corresponding to a cross sectional portion of a component 100 is formed, as will be described in further detail below. The steps are repeated to form additional layers, until the layers form the component 100.

In one example, the dispenser 50 is a roller which rolls the build-up material 48 onto the base 22. However, other dispensers 50 may be used.

In one example, the beam source 52 is a laser or electron beam capable of melting, or sintering, the build-up material 48. However, other beam sources 52 may be used. In one example, the build-up material 48 is a metallic powder including aluminum, titanium, nickel, and stainless steel, or combination thereof. In another example, the build-up material 48 includes composite ceramics. In another example, the build-up material 48 is nickel-chromium based alloy. However, other build-up materials 48 may be used depending on pre-determined environmental characteristics of the component 100 to be formed.

The third chamber 14 is adjacent to second chamber 12 and includes the third door 38, a fourth door 56 and platform 54. If third door 38 is in an open position, base 22, with now formed component 100 and excess build-up material 48, is moveable from first platform 32 in the second chamber 12 to platform 54 of third chamber 14 via third transfer mechanism 58 (shown schematically). Third door 38 can then be moved to a closed position such that third chamber 14 is fluidly sealed from second chamber 12. The fourth door 56 is in a closed position when the third door 38 is in an open position such that the second chamber 12 and third chamber 14 are sealed from the outside environment.

Once the base 22, with formed component 100 and excess build-up material 48 is disposed on platform 54, additional processes may be performed, if needed, in the third chamber 14 before removing component 100 from the building system 8. In one example, tooling 60 (shown schematically) is provided for cutting the component 100 from base 22. Alternatively, a portion of base 22 may form part of the component 100. In another example, tooling 60 can be used for finishing processes such as removing excess build-up material 48, peening, cleaning, or heat treatment of the component 100. In one example, tooling 60 is a vacuum or brush to remove excess build-up material 48. While third door 38 is in a closed position, the fluid parameters of the third chamber 14 can be modified for use with the additional processes.

After additional processes are completed in the third chamber 14, component 100 is removed through the fourth door 56 if fourth door 56 is in the open position. Fourth door 56 moves vertically along axis A between an open position, where the third chamber 14 is in fluid communication with an outside environment, and a closed position, where fourth door 56 fluidly seals the third chamber 14 from the outside environment. Components 100 are removed by fourth transfer mechanism 62, or manually by an operator. Fourth door 56 seals by contacting third chamber 14, and if used, fourth transfer mechanism 62 if in the closed position. Third door 38 is in a closed position when the fourth door 56 is opened to seal the second chamber 12 from the outside environment.

In this example, building system 8 further includes the controller 16 in communication with the first chamber 10, second chamber 12, and third chamber 14, to control operation of the features of each chamber 10, 12, 14. The controller 16 controls movement of the bases 22 by the first, second, third, and fourth transfer mechanisms 26, 30, 58, 62, as well as the positioning of first, second, third, and fourth doors 18, 20, 38, 56 in either an open or closed position. The controller 16 further controls depositing of the build-up material 48 on the base 22, and the pattern and amount of heat applied via beam source 52 in the second chamber 12. The controller 16 also controls tooling 60 in the third chamber 14 to effectuate finishing processes, as described above.

In one example, the controller 16 is in communication with a first sensor 70, a second sensor 72, and a third sensor 74 disposed in the first chamber 10, second chamber 12, and third chamber 14, respectively. The first sensor 70, second sensor 72, and third sensor 74 measure a number of fluid parameters in the first chamber 10, second chamber 12, and third chamber 14 such that controller 16 is able to monitor the fluid parameters and determine whether one or more of the fluid parameters of the chambers 10, 12, 14 are approximately equal. If the fluid parameters of the chambers 10, 12, 14 are approximately equal, bases 22 are moved into second chamber 12 and bases 22 with formed components 100 are moved out of the second chamber 12 without changing the fluid parameters of the second chamber 12. If the forming process is taking place in the second chamber 12, controller 16 maintains the fluid parameters of the second chamber 12 while also adjusting or maintaining the fluid parameters of the first chamber 10 and third chamber 14 to be approximately equal to the fluid parameters of the second chamber 12 by the conclusion of the forming process in the second chamber 12.

In one example, the fluid parameters measured by the first sensor 70, second sensor 72, and third sensor 74 include at least one of the moisture level, temperature, and oxygen content. However, other fluid parameters may be measured and controlled. In one example, the first sensor 70, second sensor 72, and third sensor 74 are residual gas analyzers that are capable of monitoring numerous fluid parameters, including levels of nitrogen, hydrogen, oxygen, and carbonous gases, as well as fluid pressure levels in the respective chambers 10, 12, 14.

At least one pump 80, controlled by controller 16, is in fluid communication with the first chamber 10, second chamber 12, and third chamber 14 to change or maintain the fluid parameters within each chamber 10, 12, 14. In this way, the controller 16 can cause the fluid parameters in the first chamber 10 and the third chamber 14 to be approximately equal to the fluid parameters of the second chamber 12 before opening second door 20 or third door 38.

In one example, the oxygen content of the second chamber 12 is controlled to produce components 100 in the forming process that are not oxygen enriched. In this example, the oxygen content of the second chamber 12 is set and maintained at less than 10 parts per million. However, other oxygen levels may be used depending on the build-up material 48 used.

In this example, pump 80 provides argon gas into the second chamber 12 via inlet 82 and removes residual oxygen through outlet 84. Similarly, an inlet 82 and outlet 84 in fluid communication with pump 80 are provided in the first chamber 10 and the third chamber 14 to allow the oxygen content of the first chamber 10 and third chamber 14 to match the second chamber 12 before opening second door 20 or third door 38.

In one example, a computer aided design (CAD) system 90 (shown schematically) provides a pre-determined three-dimensional component 100 design having a plurality of layers to the controller 16 as is known in the art. The controller 16 controls beam source 52 to create each layer based on the design provided from the CAD system 90.

In one example, any of first transfer mechanism 26, second transfer mechanism 30, third transfer mechanism 58, and fourth transfer mechanism 62 is one of a set of rails, a conveyor, or a belt which can move bases 22. However, other transfer mechanisms 26, 30, 38, 56 may be used.

In one example, any of the first door 18, second door 20, third door 38, and fourth door 56 are arranged to move in different directions to move between the closed position and the open position. In one example, the any of the doors 18, 20, 38, 56 can move in a direction perpendicular to axis A to move between the closed position and the open position. In another example, any of the doors 18, 20, 38, 56 can move about a pivot along axis A such that the doors 18, 20, 38, 56 swing open or shut to move between the closed position and the open position. Other arrangements of doors 18, 20, 38, 56 may used such that doors 18, 20, 38, 56 fluidly seal the corresponding chamber 10, 12, 14 when in the closed position.

While the second chamber 12, having pre-determined fluid parameters, undertakes the forming process, the first chamber 10, second chamber 12, and third chamber 14 may have different fluid parameters at any time while the second door 20 and third door 38 remain closed to fluidly seal the second chamber 12 from the first chamber 10 and third chamber 14. During operation, the fluid parameters of the first chamber 10 and second chamber 12 are approximately equal when second door 20 is in the open position. Fluid parameters of the second chamber 12 and the third chamber 14 are approximately equal when the third door 38 is in the open position. In this manner, the fluid parameters of the first chamber 10 becomes equalized with those of the second chamber 12 after first door 18 and second door 20 are in a closed position by the controller 16, but before second door 20 is opened to move a base 22 to the second chamber 12. Similarly, the fluid parameters of the third chamber 14 becomes equalized with those of the second chamber 12 after third door 38 and fourth door 56 are in a closed position by the controller 16, but before third door 38 is opened to receive a formed component 100 and base 22 from the second chamber 12. Therefore, changed fluid parameters due to loading of bases 22 into the first chamber 10 or post-processing and removal of components 100 in the third chamber 14 do not affect the forming process in the second chamber 12. In one example, approximate equalization of fluid parameters in the first chamber 10 and the third chamber 14 occurs while the second chamber 12 is forming a component 100.

Figure 2:
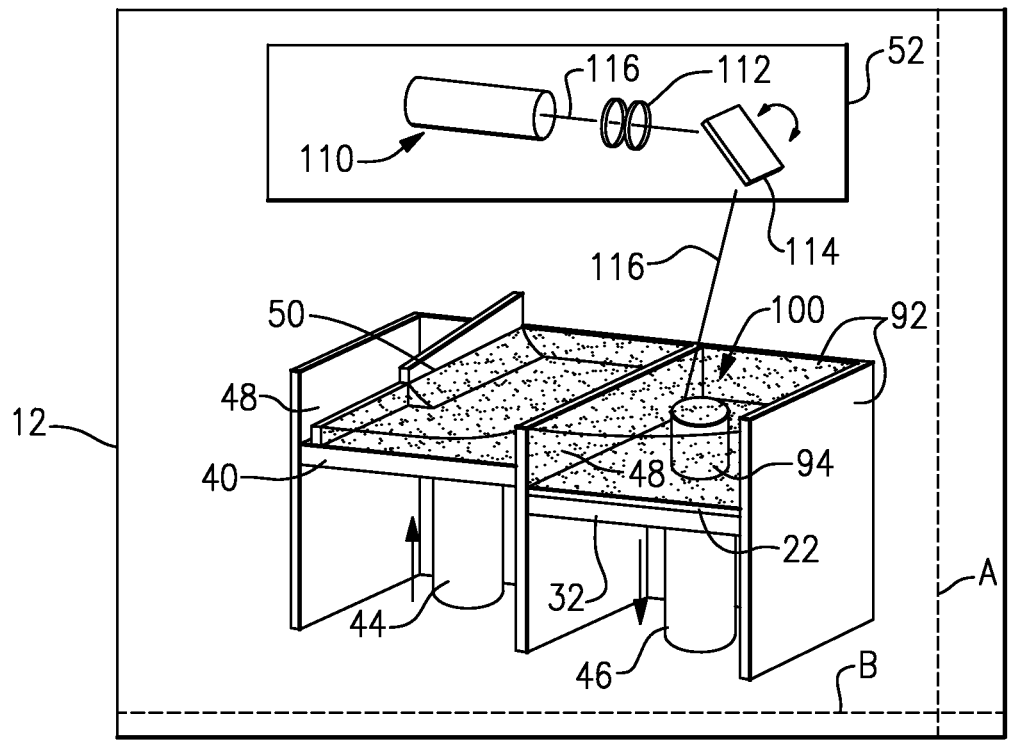
FIG. 2 is a perspective view of a partially cutaway example second chamber of the multi-dimensional component building system of FIG. 1.
Figure 3:
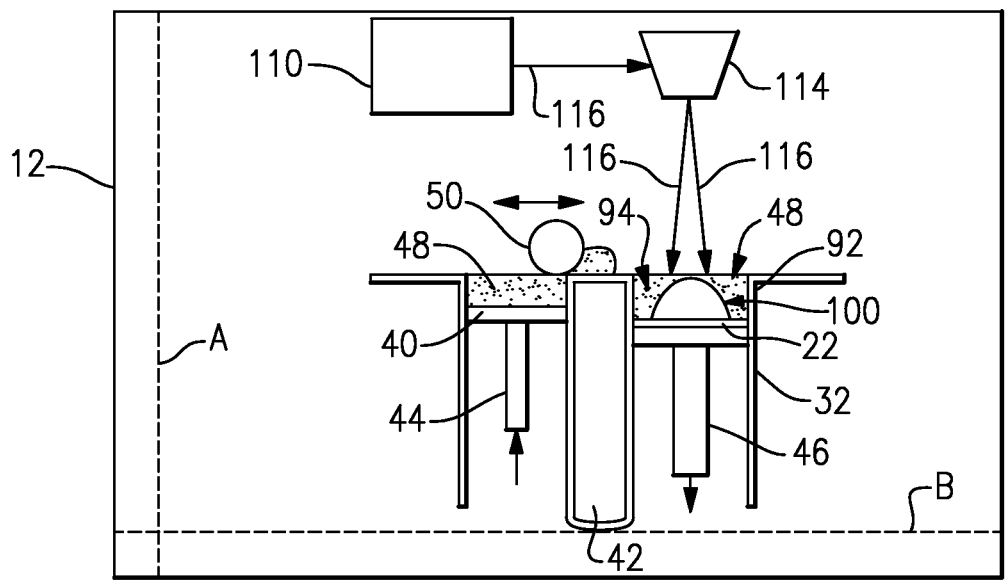
FIG. 3 is a cross-sectional view of a portion of an example second chamber of the multi-dimensional component building system of FIG. 1.

Referring to FIGS. 2 and 3, with continued reference to FIG. 1, the first platform 32 is attached to first piston 44 and second platform 40 is attached to second piston 46 in the second chamber 12. The build-up material 48 is pre-disposed on second platform 40. Dispenser 50, such as a roller, is vertically aligned with the top of wall 42 along axis A and distributes a layer of build-up material 48 over wall 42 onto base 22 arranged on first platform 32. Dispenser 50 may move across the entire first platform 32 to evenly distribute build-up material 48 on base 22. Dispenser 50 then moves back to the second platform 40 side of second chamber 12.

The wall 42, base 22, and side walls 92 of second chamber 12 form a cavity 94 to hold a bed of build-up material 48. The beam source 52 heats predetermined portions of the build-up material 48 in the cavity 94 to form a layer of the component 100.

After the layer is formed, first piston 44 moves first platform 32 and base 22 downwards while second piston 46 moves second platform 40 and supply of build-up material 48 upwards such that another portion of the build-up material 48 is disposed above wall 42. The dispenser 50 can then move more build-up material 48 into cavity 94 and onto the base 22 on the first platform 32 to begin the steps of forming another layer of component 100. By arranging the first platform 32 and base 22 level or below the second platform 40, the dispenser 50 is able to continuously add additional build-up material 48 to the already present build-up material 48 in the cavity 94 such that build-up material 48 in the cavity 94 forms the layers of the component 100 through melting or sintering by the beam source 52.

In this example, the beam source 52 includes a laser 110, lenses 112, and a scanning mirror 114. However, other arrangements of beam sources 52 may be used. The laser 110 provides a laser beam 116 which is magnified by lenses 112 and redirected by scanning mirror 114 to contact a pre-determined portion of the build-up material 48 in the cavity 94 corresponding to a layer of the component 100. In this example, scanning mirror 114 is rotatable about axis A and axis B such that the scanning mirror 114 can redirect the laser beam 116 to any part of the cavity 94. The laser beam 116 heats the build-up material 48 to melt or sinter the build-up material 48, forming the layer of the component 100. In one example, the laser beam 116 heats the build-up material 48 in the cavity 94 at a temperature in the range of 2300° F. to 2440° F. (1260° C.-1338° C.). However, other temperatures may be used.

Referring to FIGS. 1-3, in operation at least one base 22 is provided to the building system 8 and is loaded onto platform 24 of the first chamber 10, either via first transfer mechanism 26 or manually by an operator. Once the at least one base 22 is in the first chamber 10, the first door 18 and second door 20 are moved to a closed position such that the first chamber 10 is fluidly sealed. Controller 16 adjusts the fluid parameters of the first chamber 10 to be approximately equal to the fluid parameters of the second chamber 12. Once the first chamber 10 and second chamber 12 are equalized, second door 20 is moved to an open position and base 22 is moved onto first platform 32 of second chamber 12.

Once base 22 is disposed on the first platform 32 of the second chamber 12, second door 20 is moved to a closed position, while third door 38 is in a closed position as well. A dispenser 50 moves build-up material 48 over wall 42 and onto the base 22. Base 22, side walls 92, and wall 42 form a cavity 94 for holding build-up material 48. After the dispenser 50 moves back to the second platform 40 side, the beam source 52 provides directed heat to specified portions of the cavity 94 to melt or sinter the build-up material 48 and form a layer of the component 100. Once this layer is complete, the first piston 44 moves the first platform 32 and base 22 downwards while the second piston 46 moves the second platform 40 with the supply of build-up material 48 upwards such that dispenser 50 can move more build-up material 48 into cavity 94. The process is repeated until all layers of the component 100 are formed.

The fluid sealing between the second chamber 12, and first chamber 10 and the third chamber 14, if the second door 20 or third door 38 are in an closed position, as well as the fluid parameter balancing between the chambers 10, 12, 14, allows the component 100 forming process to occur in the second chamber 12 in an environment conducive to meeting component 100 specifications, such as low oxygen enrichment. At the same time, first chamber 10 can be exposed to the outside environment for loading of bases 22 and third chamber can be exposed to the outside environment for removal of bases 22, or the third chamber can have its fluid parameters changes for post-processing. The fluid parameters of first chamber 10 are equalized to those in second chamber 12 during the component 100 forming process. During the forming process, fluid parameters of the third chamber 14 are also adjusted and maintained to be equal to fluid parameters of the second chamber 12 before the forming process is completed.

If the forming process is complete in the second chamber 12, and fluid parameters of third chamber 14 are equalized to fluid parameters of second chamber 12, third door 38 is moved to an open position and the base 22 with formed component 100 is moved to platform 54 of third chamber 14 while maintaining the fluid parameters of the atmosphere of the second chamber 12.

After third door 38 is shut, the second chamber 12 receives another base 22 from first chamber 10 to start another forming process. First chamber 10 has fluid parameters equalized to the fluid parameters of second chamber 12 during the forming process, allowing second door 20 is opened to move another base 22 into second chamber 12 while maintaining the fluid parameters of the atmosphere of the second chamber 12.

Upon completion of the forming process, second chamber 12 is ready to commence another forming process without any delay for atmospheric adjustment, operator interaction, or excess build-up material 48 removal. Constant supplies of bases 22 can be provided without interrupting ongoing forming processes in the second chamber 12, or post-processing in the third chamber 14.

Base 22 with formed component 100 in third chamber 14 can undergo a number of post-processes, as described above, before being removed through fourth door 56, either by fourth transfer mechanism 62 or manually by an operator, for use. Performance of post-processes will not affect, or slow, forming process occurring in the second chamber 12.

In one example, second door 20 and third door 38 may be opened simultaneously such that as the base 22 with formed component 100 is moved to the third chamber 14, another base 22 is moved into the second chamber 12. However, second door 20 and third door 38 can be operated independently.

In one example, the first chamber 10, second chamber 12, and third chamber 14 are pressurized such that the second chamber 12 has a higher fluid pressure than the first chamber 10 and third chamber 14. The higher fluid pressure in the second chamber 12 prevents any contaminants from entering the atmosphere of the second chamber 12 and affecting the fluid parameters of the second chamber 12 if the second door 20 or third door 38 is open. In one example, the first chamber 10 and third chamber 14 are maintained at the same fluid pressure.

In one example, the component 100 formed is one of a turbine blade or vane, a gear, or a denture for use in a turbine engine. However, other components 100 may be formed.

In another example, a used component (not shown) is disposed on the base 22 in the first chamber 10. The used component is then moved into the second chamber 12, as described above, to undergo the forming process. Surfaces of the used component are restored using the forming process described above. The used component can then be moved to the third chamber 14 to undergo finishing process, as described above, before being removed from the building system 8.

Figure 4:
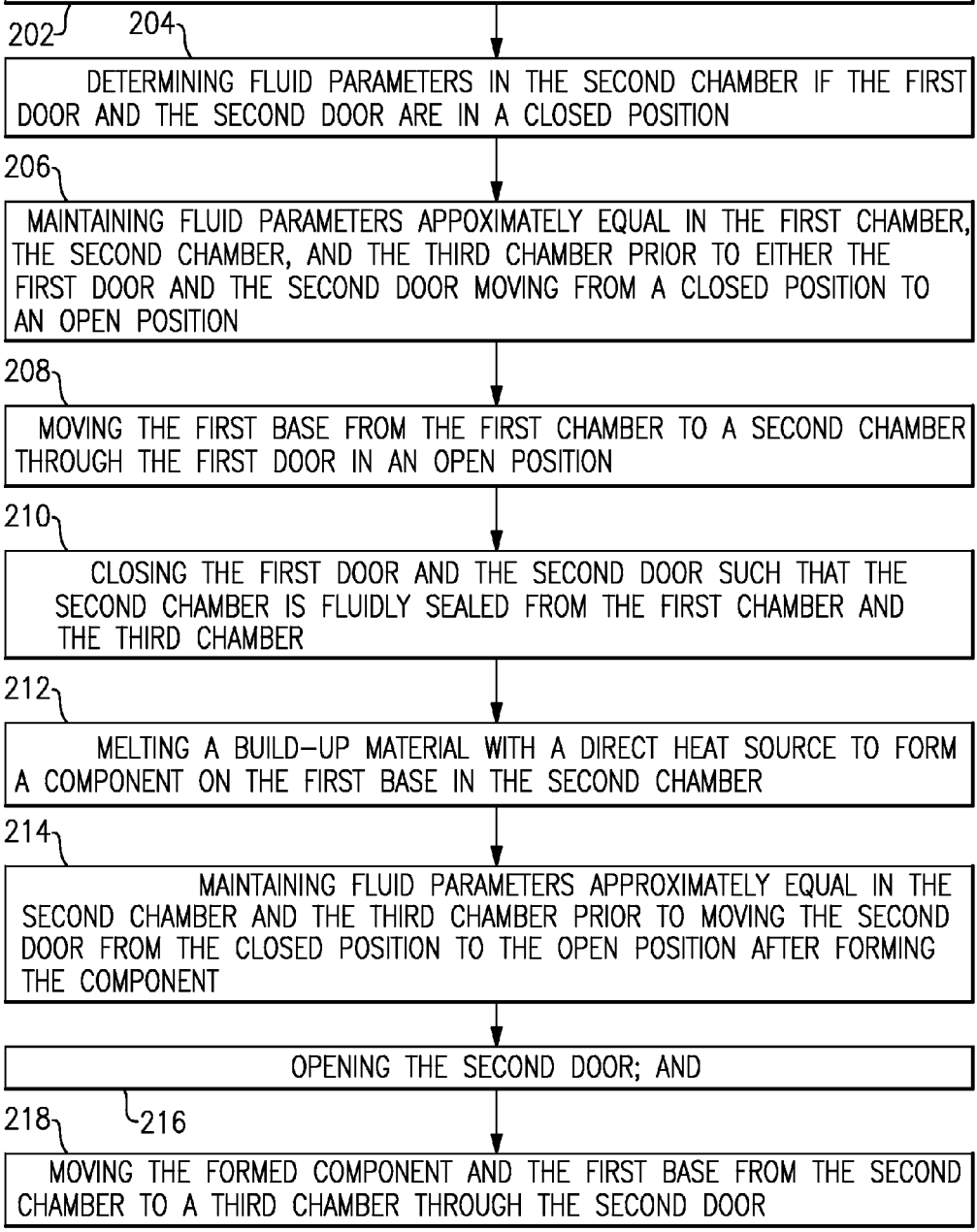
FIG. 4 is a flow chart of an example method of forming a multi-dimensional component.

Referring to FIG. 4, an example method of building a multi-dimensional component 200 includes providing a first chamber, a second chamber, and a third chamber 202. The first chamber and second chamber are connected by a first door and the second chamber and the third chamber are connected by a second door 202. The first door fluidly seals the first chamber from the second chamber and the second door fluidly seals the second chamber from the third chamber 202. A first base is disposed in the first chamber 202. The fluid parameters in the second chamber are determined if the first door and second door are in a closed position 204. The fluid parameters are maintained approximately equal in the first chamber, the second chamber, and the third chamber prior to either of the first door and the second door moving from a closed position to an open position 206. The first base is moved from the first chamber to a second chamber through the first door in an open position 208. The first door and the second door are closed such that the second chamber is fluidly sealed from the first chamber and the third chamber 210. A build-up material is melted with a direct heat source to form a component on the first base in the second chamber 212. The fluid parameters are maintained approximately equal in the second chamber and the third chamber prior to moving the second door from the closed position to the open position after forming the component 214. The second door is opened 216 and the formed component and the first base are moved from the second chamber to a third chamber 218.

Although the different examples have the specific components shown in the illustrations, embodiments of this disclosure are not limited to those particular combinations. It is possible to use some of the components or features from one of the examples in combination with features or components from another one of the examples. A worker of ordinary skill in this art would recognize that certain modifications would come within the scope of this disclosure. For that reason, the following claims should be studied to determine the true scope and content of this disclosure.

What is claimed is:

1. A multi-dimensional component building system comprising:
- a first chamber having at least one base disposed therein and a first sensor that monitors the fluid parameters of the first chamber;
- a second chamber adjacent to and in fluid communication with the first chamber configured to receive the at least one base, the second chamber containing a directed heat source and a dispenser in communication with a build-up material configured to form a component on the at least one base by melting or sintering, and a second sensor that monitors the fluid parameters of the second chamber;
- a first door that fluidly seals the first chamber from the second chamber in a closed position;
- a first transfer mechanism configured to transfer the at least one base from the first chamber to the second chamber;
- a third chamber adjacent to and in fluid communication with the second chamber having a third sensor that monitors the fluid parameters of the third chamber;
- a second door that fluidly seals the third chamber from the second chamber in a closed position;
- a second transfer mechanism configured to transfer the at least one base from the second chamber to the third chamber;
- a controller in communication with the first sensor, second sensor, and third sensor, configured to open the first door when the fluid parameters of the first chamber are approximately equal to the fluid parameters of the second chamber.

2. The system of claim 1, wherein the controller is in communication with at least one pump, wherein the pump is fluidly connected to the first chamber, the second chamber, and the third chamber and configured to adjust fluid parameters of at least one of the first chamber, the second chamber, and the third chamber in response to a command from the controller.

3. The system of claim 1, wherein the fluid parameter is oxygen content.

4. The system of claim 3, wherein the oxygen content in the second chamber is maintained equal to or below 10 parts per million.

5. The system of claim 1, wherein the third chamber includes tooling to remove excess build-up material.

6. The system of claim 5, wherein the tooling is one of a vacuum or a brush.

7. The system of claim 1, wherein the fluid in the second chamber is maintained at a higher pressure then the fluid in the first chamber and the third chamber.

8. The system of claim 1, wherein the at least one base is moveable relative to a platform disposed in the second chamber.

9. The system of claim 1, wherein the controller is operable to control the fluid parameters of the first chamber and third chamber such that when only one of the first door and second door is in an open position, the first chamber and the third chamber have different fluid parameters.

10. The system of claim 1, wherein the controller is configured to maintain the oxygen content in the second chamber equal to or below 10 parts per million.

11. The system of claim 1, wherein the fluid parameters comprise humidity.

12. A multi-dimensional component building system comprising:
- a first chamber including at least one base on a first platform moveable by a first piston adjacent a second platform moveable by a second piston, a dispenser in communication with build-up material disposed on the second platform, a beam source to form a component on the at least one base from the build-up material by melting or sintering, and a first sensor that monitors the fluid parameters of the first chamber;
- a second chamber adjacent to and in fluid communication with the first chamber having a second sensor that monitors the fluid parameters of the second chamber;
- at least one door that fluidly seals the first chamber from the second chamber in a closed position;
- a controller configured to open the at least one door when the fluid parameters of the first chamber are approximately equal to the fluid parameters of the second chamber.

13. The system of claim 12, wherein the first platform and the second platform are separated by a wall, the at least one base, wall, and side walls of the first chamber forming a cavity receiving the build-up material from the second platform.

14. The system of claim 12, wherein the beam source is one of a laser or electron beam.

15. The system of claim 12, wherein the at least one base is moveable relative to the first platform.

16. The system of claim 12, wherein the at least one base is movable relative to the first platform and first piston disposed in the second chamber.

* * * * *